March 28, 1967  N. G. WEITZMAN ETAL  3,310,884

TEACHING MACHINE AND MOTOR RESPONSE TRAINING APPARATUS

Filed June 1, 1965  4 Sheets-Sheet 1

INVENTORS.
NORMAN G. WEITZMAN
BARRY S. WEITZMAN

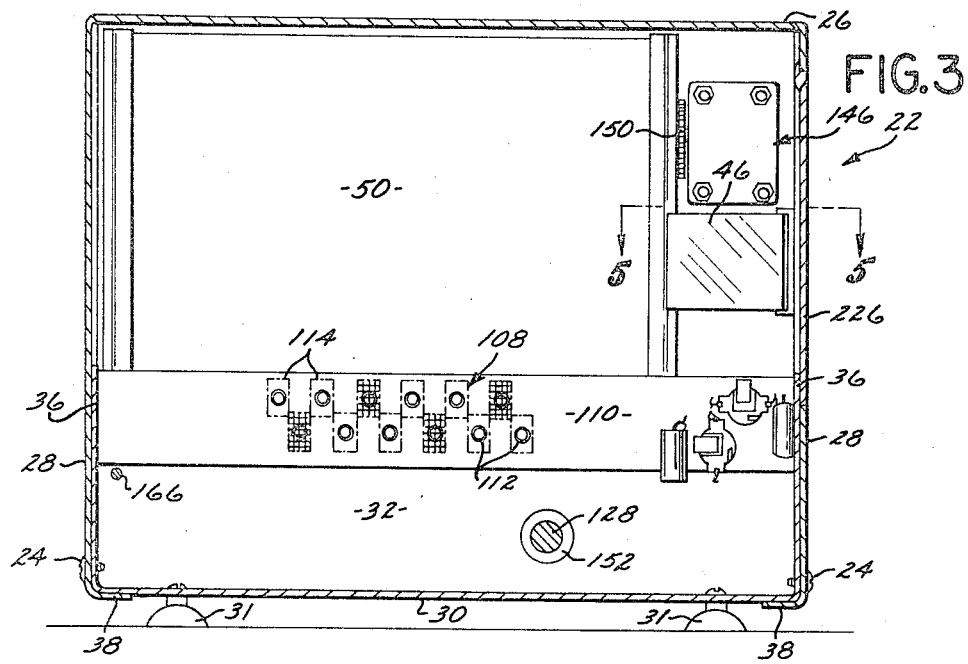
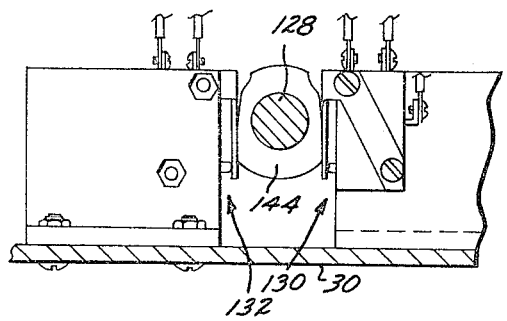
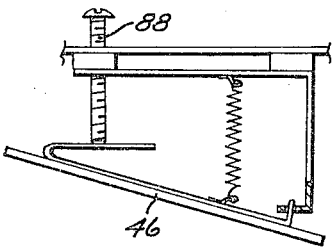
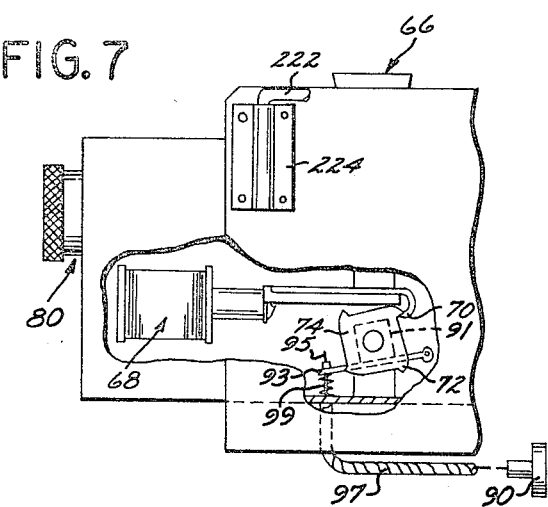
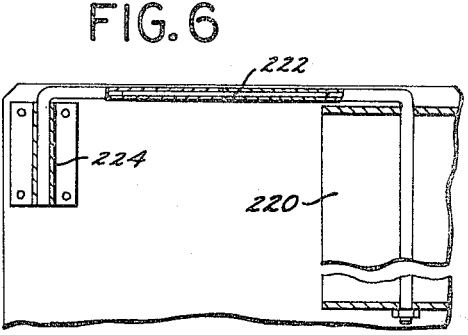
INVENTORS.
NORMAN G. WEITZMAN
BARRY S. WEITZMAN

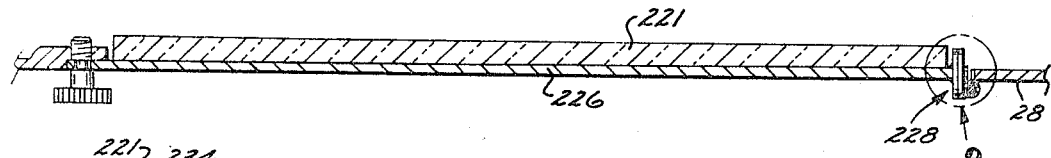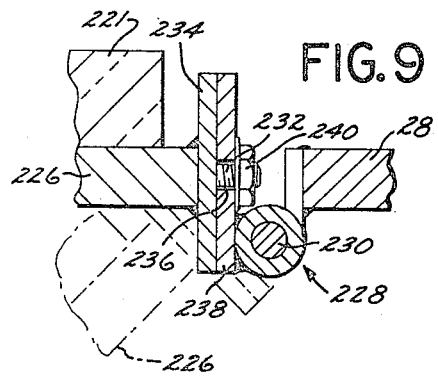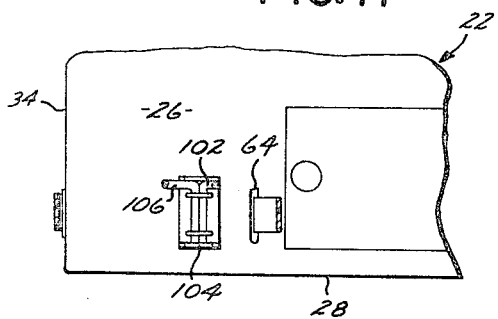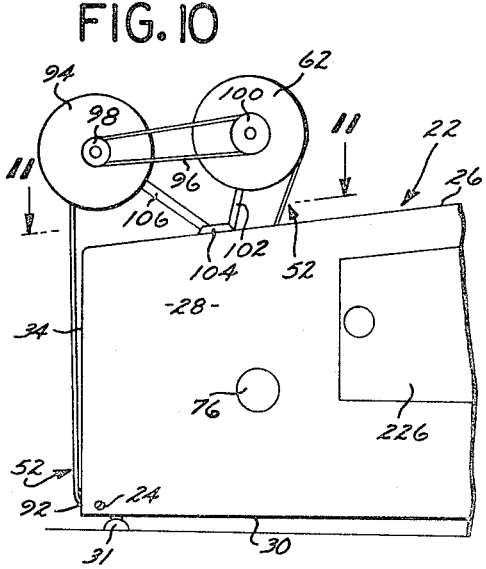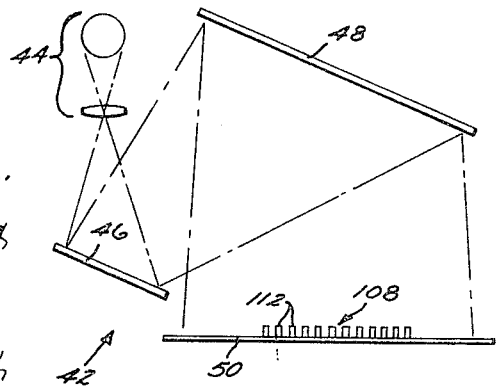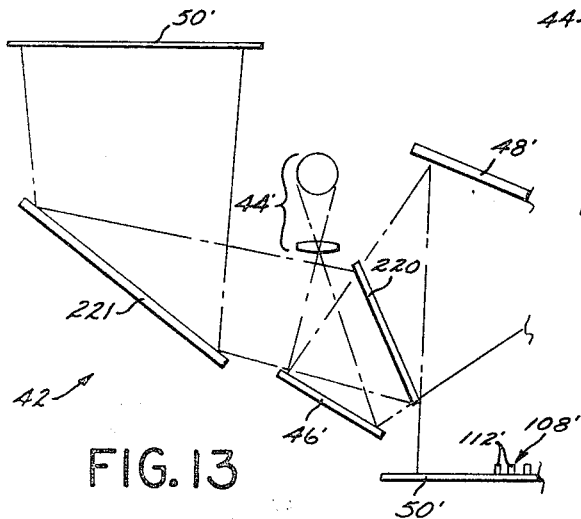

United States Patent Office 3,310,884
Patented Mar. 28, 1967

3,310,884
TEACHING MACHINE AND MOTOR RESPONSE
TRAINING APPARATUS
Norman G. Weitzman and Barry S. Weitzman, both c/o
Arnold J. Provisor, attorney at law, 16401 Knapp St.,
Sepulveda, Calif. 91343
Filed June 1, 1965, Ser. No. 460,167
18 Claims. (Cl. 35—12)

Generally speaking, the present invention relates to the teaching machine art and, more particularly, in one exemplary preferred form thereof, pertains to a teaching machine of a type which might be said to comprise a motor response training apparatus, such as an apparatus for training a student pilot to fly an airplane, for example. While the apparatus is particularly well suited for such motor response training purposes as training a student to fly an airplane, or the like, it should be clearly noted that it may be employed for a great variety of different types of motor response training purposes and, in a more broad, general sense, may be employed as a teaching machine for teaching the effective solution of problems of any of a variety of different types, either in the form of a sequence or group of related problems. or an individual problem, or a plurality of individual and distinct problems. However, since one exemplary embodiment of the present invention comprises a motor response training apparatus adapted for teaching a student pilot to fly an airp'ane, this specific version of the invention will be the one referred to primarily hereinafter and described in detail hereinafter. It should be clearly understood that this is for exemplary purposes only and is not to be construed as specifically limiting the invention to such a particular form, application, and use of the invention which has a very much broader generic concept, and correspondingly very much broader applications, uses, and purposes than said exemplary pilot training form of the invention described in detail hereinafter.

In a general way, the invention may be said to comprise problem presentation means for visibly presenting a problem for effective solutions, comprising an appropriate motor response, by a student or trainee. In one preferred exemplary form of the invention, said problem presentation means comprises film strip, still picture type optical projector means adapted to be provided with a plurality of projection panel frame means in the form of a multi-frame film strip means, with at least certain of said projection panel frame means each having a problem presentation portion (in a preferred version of the invention, an upper portion) and each having a problem correct answer and response portion (in a preferred version of the invention, comprising a lower portion thereof). Said problem presentation means also includes projection or viewing screen means adapted to have projected thereon and to visibly display to a student or trainee an image of any individual problem presentation upper portion only of any corresponding individual one of said projection panel frame means in a manner such that the student may view the image of said problem presentation portion so as to be informed of the problem which the student is to respond to or effectively solve. Said projection screen means is so arranged as to have a lower portion visibly cutting off and obscuring from the field of view of the student or trainee the corresponding image of the corresponding lower problem correct answer and response portion of the corresponding projection panel frame means, which will impinge upon a plurality of photosensitive means adapted to be rendered either conductive or non-conductive in accordance with what might be termed a plurality of answer code projection regions comprising said lower problem correct answer and response portion, said photosensitive means being in circuit with a plurality of selectively connectable switch means operable in response to corresponding operation of corresponding control means by the student or trainee in a manner such that only the correct operation of said control means in a manner which corresponds to the proper answer solution and motor response action on the student's part to the particular problem presented on the projection or viewing screen means, will allow the next projection frame means to be advanced into projection relationship with respect to the optical projector means.

Also, in the event that the student or trainee has improperly operated said controls so as to not comprise the proper answer or response to the problem visibly presented on the projection screen means, it will be noted that, in addition to it being impossible for the next projection panel frame means to be advanced into projection relationship with respect to the optical projector means, an error counter will be operated and will keep a record of the total of the student's errors during a series of problem presentation and answer operations. Normally, neither advancement of the projection panel frame means to the next frame thereof, in the event that a correct answer and response has been provided by the student, nor operation of the error counter in the event that an incorrect answer and response has been provided by the student or trainee, will occur until the student or trainee operates a manually operable advancement switch means, at which time he will discover whether he has made the correct answer and response to the visibly presented problem because if he has, the projection panel frame means will be advanced to the next projection position and no operation of the error counter will occur and, on the other hand, if he has made an incorrect answer and response to the previously visibly presented problem, when the student operates said manually operable advancement switch means, the error counter will add up another error to his total to that point, and the projection panel frame means will not advance to the next position. In fact, it will be necessary for the student to again operate the controls in an attempt to provide the proper answer and response to the visibly presented problem and to continue to do so, in each case followed by operation of the manually operable advancement switch means, until such time as the student finally makes the correct answer and response, at which time operation of said manually operable advancement switch means will cause advancement of the projection panel frame means to the next frame projection position. In the meantime, each incorrect response and answer provided by the student incorrectly operating the control means and followed by an operation of the advancement switch means, will have produced an additional, individual operation of the error counter means.

It will be noted that, in the exemplary form of the invention referred to hereinbefore, wherein the motor response training apparatus effectively comprises pilot training apparatus, the previously mentioned control means may simulate the conventional flight control members of an airplane, comprising an airplane rudder control means, an airplane aileron control means, an airplane elevator control means, and an airplane engine throttle control means, with each of said four different types of control means being operable in any of the three manners, comprising opposite extreme manners and an intermediate or neutral manner, and thus providing a total of three possible ways of operating any of the four different sets of controls, either individually or in various combinations, as required by the conditions of the problem visibly presented on the projection screen means, and which may, in certain forms, comprise the projection on the projection screen means of images of a plurality of conventional flight instruments indicating air speed, azimuth heading in degrees, horizontal orientation around a longitudinal fore and aft axis of the plane and a lateral left-to-right axis perpendicular to said longitudinal axis with respect to a true horizontal, such as the horizon where the earth and sky apparently meet (responsive in the first instance primarily to aileron position and in the second instance primarily to elevator position), altitude, turn and bank orientation (responsive primarily to rudder position and aileron position), and rate-of-climb-or-descent (responsive primarily to elevator position and engine throttle position). However, it should be noted that the invention is not specifically limited to the arrangement just described and, actually, the problem may comprise the visual presentation of images on the projection screen means of navigation instruments other than the conventional flight instruments just referred to or may comprise the visual presentation on the projection screen means of images of actual visual contact situations corresponding to situations which a pilot would see if he looked out of an airplane toward the ground, approaching mountains, other nearby planes, or the like, and recognized a situation which required immediately corrective action on his part by operating the corresponding control means.

While the above, in a general way, describes the basic elements of the present invention as applied to the form of the invention wherein it comprises a pilot training apparatus, it should be clearly noted that the type of control means and the type of projected images comprising the one or more problems to be solved by the student or trainee will quite naturally vary widely in the event that the apparatus is modified for different types of motor response training purposes and will vary even more substantially in the event that the apparatus is modified to provide primarily a teaching machine for allowing the student to provide an effective solution, in a broad sense, for any visibly presented problem. It should be understood that all such modifications are intended to be included and comprehended within the broad scope of the present invention.

It should further be understood that the present invention provides a teaching machine and/or motor response training apparatus of the character referred to above, which is of relatively simple, easy-to-operate, inexpensive, construction, and which lends itself readily to being adapted to the teaching or training of motor responses or, more generally, of proper responses providing the proper solution to any visibly presented type of problem, whether of an individual type, a series of related or discrete problems, or a plurality of interconnected problems presented in a predetermined or desired sequence, and it does so in a manner much more flexible and adaptable for the purposes outlined above than conventional prior art motor response training devices, most of which are not under the individual control of the student but merely operate in a timed or predetermined fashion, presenting a predetermined sequence of conditions to a student for either predetermined or timed attempted problem responses, whereby to provide a total score at the end of the predetermined sequence of problems presented or at the end of a predetermined period of time. Such prior art devices are relatively inflexible and not adaptable for operation by a student at his own selected time rate of problem solution, nor are they adaptable for allowing a student to make repeated tries at properly solving a problem in the highly desirable manner of the apparatus of the present invention. Furthermore, most such prior art response training apparatuses are much more complex, difficult-to-maintain in operative condition, and costly than the novel teaching machine and/or motor response training apparatus of the present invention, which, additionally, is of a relatively foolproof type virtually incapable of improper operation by reason of the nature of the interrelationships of the various elements thereof.

With the above points in mind, it is an object of the present invention to provide a novel teaching machine and/or motor response training apparatus of the character referred to herein, having the advantages referred to herein and including the features referred to herein, generically and/or specifically, and individually or in combination, and which is of relatively simple, inexpensive, and easy-to-use construction, adapted for ready mass manufacture at relatively low cost, whereby to be conducive to widespread use thereof. Furthermore, the apparatus is of relatively small size, which lends itself to ready portability.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, one exemplary embodiment of the invention is illustrated in the hereinbelow-described figures of the accompanying four sheets of drawings and is described in detail hereinafter.

Figure 2:
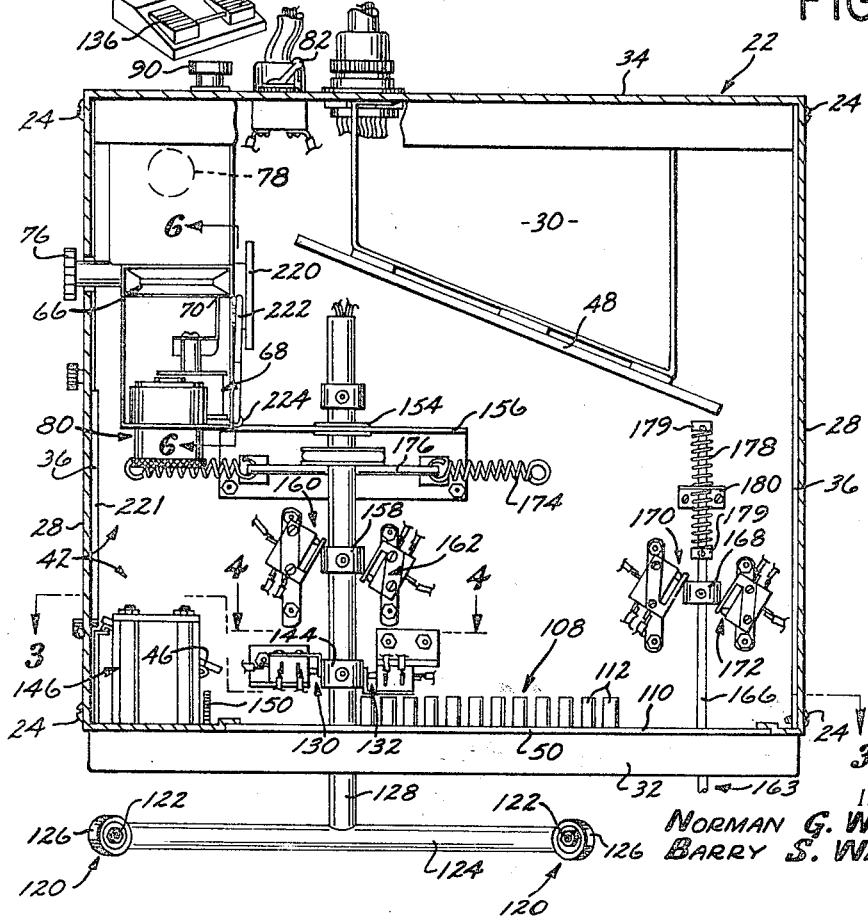
FIG. 2 is a somewhat larger scale, fragmentary, top view, taken substantially along the plane indicated by the arrows 2—2 of FIG. 1 and which, therefore, comprises primarily a cross-sectional view of the upper housing portion and a top plan view (in certain respects, fragmentary in nature) of interior physical portions of the apparatus carried within the housing means.

FIG. 3 is a staggered plane view of the apparatus substantially as indicated by the arrows 3—3 of FIG. 2, and clearly illustrates the exemplary twelve photosensitive means carried by a vision-obscuring mounting means in the proper position for reception of the twelve light and/or dark projection image portions projected from the correct answer and response code projection means carried at the bottom of each projection panel frame means. In other words, this clearly shows the division of a projected image into an upper problem presentation portion which can be frontally viewed by a student or trainee while obscuring from the view of a student or trainee the correct answer response portion of said image which actually comprises a correct answer projection code means in the form of twelve light or dark regions adapted to be received and render either photoconductive or non-photoconductive any of the twelve photosensitive means shown in FIG. 3.

FIG. 4 is an enlarged, fragmentary, partially broken away view, taken substantially along the plane indicated by the arrows 4—4 of FIG. 2, and clearly illustrates the aileron cam means for operating the corresponding control switch means in accordance with rotary movement of the manually graspable front control member shown at the bottom of FIG. 2.

FIG. 5 is an enlarged, fragmentary view, taken substantially along the plane indicated by the arrows 5—5 of FIG. 3, and clearly illustrate the adjustable mounting of one of the image-reflecting mirror means, whereby to properly laterally frame or position a projected image on the projection screen means.

FIG. 6 is a fragmentary, partially broken away view, partly in elevation and partly in section, taken substantially along the plane indicated by the arrows 6—6 of FIG. 2, along an inside portion of the film strip, still picture type optical projector means with certain portions broken away, and also shows an additional fold-away mirror means which can be brought into play as shown in FIG. 13 when said projection panel frame means is to be forwardly projected onto an exterior large viewing or projection screen rather than upon the small projection screen carried at the front of the housing means.

FIG. 7 is a view very similar to FIG. 6 but is taken slightly farther to the right in FIG. 2 than the plane indicated by the arrow 6—6 and has the right portion thereof broken away to a greater extent than FIG. 6. Additionally, this view has a fragmentary portion of the inside wall of the projector means broken away to show the stepped or intermediate action film advancement means contained therein.

Figure 1:
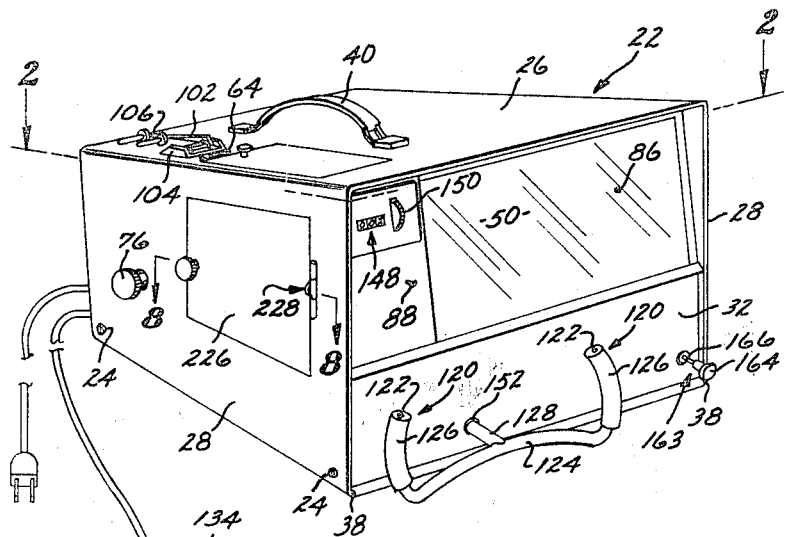
FIG. 1 is a exterior, three-dimensional, pictorial view, illustrating one exemplary embodiment of the present invention in fully assembled relationship within suitable housing means and ready for use by student or trainee. Certain portions of the exterior wiring are broken away for drawing space saving reasons.

FIG. 8 is an enlarged, fragmentary view, taken substantially along the plane indicated by the arrows 8—8 of FIG. 1.

FIG. 9 is a further enlargement, in cross-section, of the detailed portion of FIG. 8 enclosed within the broken line circle identified by the designating arrow and numeral 9 in FIG 8.

FIG. 10 is an enlarged, fragmentary, near side elevational view of the rear portion of FIG. 1, with the front portion thereof broken away and with film supply and take-up reels shown in mounted operative relationship thereon.

FIG. 11 is a fragmentary view, taken substantially along the plane indicated by the arrow 11—11 of FIG. 10.

FIG. 12 is a somewhat diagrammatic and schematic view of the normal optical or projection path or circuit of the apparatus when used in the normal back projection manner with respect to the problem presentation viewing screen carried in the front wall of the housing means of FIG. 1.

FIG. 13 is another somewhat diagrammatic and schematic view similar in many respects to FIG. 12, but illustrates an alternate mode of projection of the problem portion of a projection image so that it is exteriorly projected forwardly onto a somewhat larger, exterior, upstanding viewing screen or wall, or the like, rather than upon the self-contained small viewing screen carried at the front of the housing means of FIG. 1.

Figure 14:
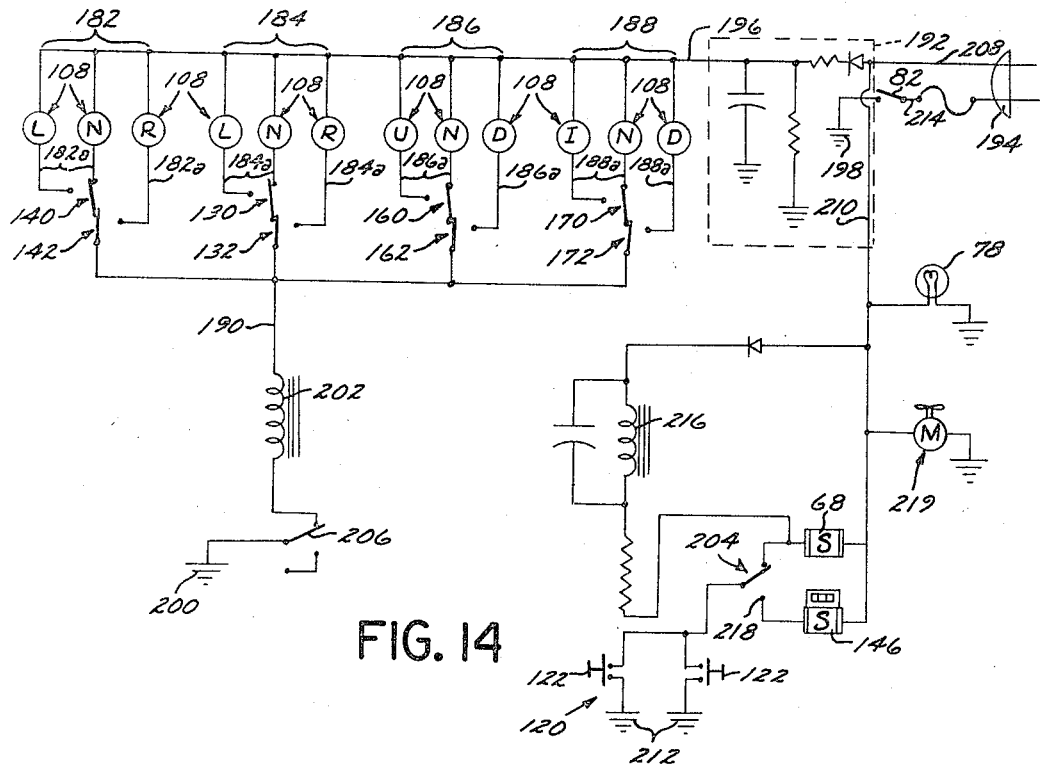

FIG. 14 is a circuit schematic view, illustrating the electrical circuitry of the exemplary form of the invention illustrated.

Figures 15, 16:
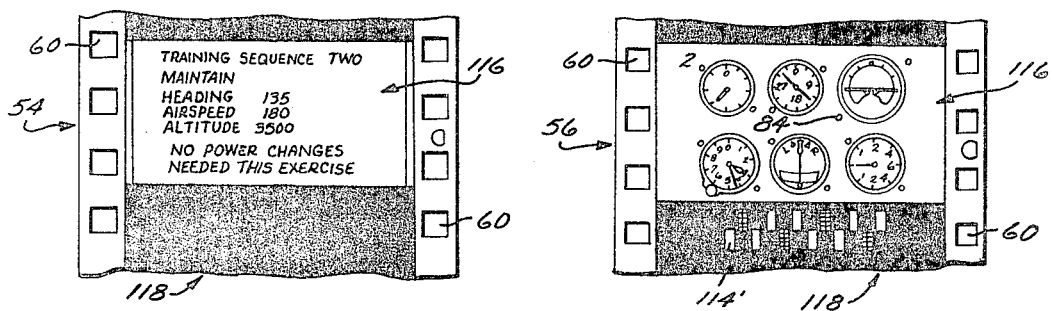

FIG. 15 is a view illustrating a single projection panel frame means (and also the image thereof) corresponding to the information setting the governing conditions of a sequence of problems which are to follow.

FIG. 16 is a view similar to FIG. 15, but illustrates the next projection panel frame means (and the projection image thereof) and shows both the upper problem presentation portion thereof and the lower coded correct answer and response portion. It should be particularly noted, however, that, in this case, all of the flight instrument images show the actual conditions which are to be maintained pursuant to the instructions set forth in the preceding image shown in FIG. 15 and, therefore, no corrective action other than the maintenance of all four controls in the neutral or intermediate position is required of a student or trainee, since this projection image shows the desired condition to be subsequently maintained. Therefore, the answer or response projection code at the bottom of the image corresponds in each case to the neutral position of each of the four controls.

Figure 17:
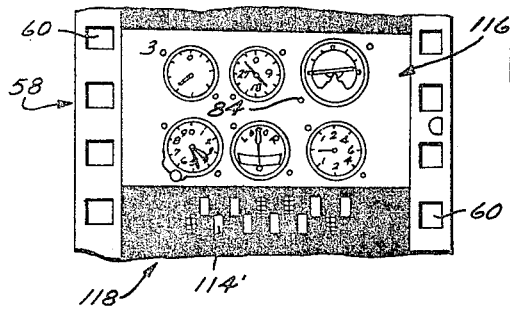

FIG. 17 is a view similar to FIG. 16, but illustrates the next projection panel frame means (and the projection image thereof) and shows both the upper problem presentation portion thereof and the lower coded correct answer and response projection portion thereof. It should be noted that, in this case, the upper right hand flight instrument image shows a changed condition from that illustrated in FIG. 16 and which corresponds to the airplane having rolled around its longitudinal fore and aft axis from the proper orientation specified in FIG. 15 and corresponding to the showing of the upper right hand instrument in FIG. 16. In other words, this view visibly presents a problem to a student pilot or trainee, requiring the proper control response action on the part of said student pilot or trainee to correspond to the answer or response projection code at the bottom of the image and which it will be noted differs from that shown at the bottom of FIG. 16 corresponding to neutral position of all of the four controls.

The exemplary first form of the invention illustrated includes a housing or housing means, generally designated at 22. Said housing 22 includes upper and lower housing portions adapted to be separated from each other when access to the interior thereof is desired, and also adapted to be placed in the closed relationship most clearly shown in FIG. 1 and fastened in said closed relationship by a plurality of self-tapping fastening screws such as those designated at 24.

Said upper housing portion is of substantially inverted U-shape as seen from the front and comprises a flat, thin-sheet top panel portion 26 and two laterally spaced, substantially vertical side panel portions 28 open at both front and rear ends thereof.

In the example illustrated, said lower housing portion includes a substantially flat, horizontal, rectangular bottom panel portion 30 which is adapted to rest upon any suitable auxiliary underlying horizontal supporting surface by way of rubber suction cup supporting feet 31, and additionally includes upstanding partial front wall means 32, upstanding rear wall means 34 and partial upstanding side wall means 36 at each side thereof. It will be noted that the side walls 28 of the upper housing portion, at the bottom edges thereof, have inwardly directed edge flanges 38 which are adapted for forward and rearward sliding movement underneath and along the corresponding bottom surface portions of the bottom panel member 30 of the lower portion of the housing 22 when the upper and lower housing portions are assembled or disassembled with respect to each other.

It will be noted that the top wall 26 of the upper portion of the housing 22 is provided with a conventional strap type carrying handle 40 to facilitate carrying the complete housing 22 and all of the apparatus mounted therein or to facilitate carrying just the upper portion of the housing 22 when it is disengaged from the lower portion of the housing 22.

The housing 22 carries what might be generally referred to as problem presentation means for visibly presenting a problem for effective solution by a student or trainee and which, in the case of a pilot training device of the exemplary and non-specifically limiting type illustrated in the figures of the drawings, will comprise an appropriate motor response by the student or trainee to various flight problems visibly presented to the student or trainee. Said problem presentation means includes a number of different components, and the various components thereof can perhaps best be designated by a single reference numeral as indicated in the diagrammatic schematic view comprising FIG. 12 wherein the complete problem presentation means is generally designated by the reference numeral 42. It will be noted that said problem presentation means, in the exemplary form illustrated, actually comprises a film strip, still picture type of optical projector means, as generally designated at 44, which is effectively provided with a pair of reflective mirror means 46 and 48.

Said problem presentation means also includes a back projection translucent type, relatively small projection screen means or viewing screen means 50, which is physically mounted in the upper partial wall portion 32 of the lower portion of the housing 22 as is perhaps best shown in FIG. 1. This projection or viewing screen means 50 may be a translucent panel of glass, plastic, or any other suitable material well adapted for back projection of any of a plurality of individual images thereon corresponding to problem presentation portions of any of a corresponding plurality of projection panel frame means of a multi-frame film strip means adapted to be positioned within the optical projector means 44 with any of a plurality of individual frames in alignment with the optics thereof for such projection of the problem presentation upper portion of said projection panel frame means on the projection or viewing screen 50 which is best shown in physical form in FIG. 1 and in somewhat diagrammatic, schematic form in FIG. 12.

It should be clearly noted that the optical projector means 44 is adapted to be provided with a plurality of the above-mentioned projection panel frame means in the form of a multi-frame film strip means, such as is generally designated at 52 in FIG. 10, and in fragmentary form at 52 in FIGS. 15, 16, and 17, which primarily illustrate individual projection panel frame means thereof, as generally designated at 54, 56, and 58, respectively.

It will be noted that said multi-frame film strip means 52 is of a conventional type having drive sprocket holes 60 along the edges thereof and is adapted to be mounted on a conventional type supply reel 62 and feed downwardly from the front edge thereof through an entry slot 64 in the top wall 26 of the upper portion of the housing 22 and then into the film guide slot 66 of the conventional type intermittent action optical projector means, generally designated at 44, whereby intermittent electrical energization of the film advancement means, generally designated at 68, and which, in the example illustrated, comprises an electrical solenoid attached to, and intermittently reciprocating a toothed pawl member 70 which engages any of a plurality of corresponding ratchet teeth 72 carried by a film drive wheel ratchet 74 which drives the conventional film sprocket (not shown since such are well known in the art) which is adapted to engage the sprocket holes 60 whereby to advance the film strip 52 a distance corresponding to one complete projection panel frame means, such as any of the three shown in enlarged form at 54 in FIG. 15, at 56 in FIG. 16, and at 58 in FIG. 17.

A removable, manually operable framing key member 76 is provided for effectively overriding the film driving means just described and comprising the element 68, 70, 72, 74, and the sprocket wheel which is not shown, so that initial projection panel frame means such as any of the three shown at 54, 56, and 58 in FIGS. 15–17, may be properly framed or aligned with respect to the projection lamp, which is shown in phantom at 78, and the projection lens means 80. In other words, when the device is to be initially placed in operative condition with respect to the film strip 52, a free end thereof is fed downwardly from the forward edge of the supply reel 62 of FIG. 10, is passed through the cover slot 64, and is fed downwardly into the interior film guide slot or aperture 66 until it comes into engagement with the conventional driving sprocket wheel means (not shown) of the projector means 44. Then the framing key 76 is pushed inwardly, which effectively disengages the conventional frictional driving contact (not shown since such is well known in the art) between the film drive wheel ratchet 74 and the previously mentioned conventional film sprocket (not shown) whereby to effectively disengage same. Then the projection lamp 78 is energized by the main control switch 82 and the image projected by the projector means 44 of whatever projection panel frame means (such as any of those shown at 54, 56, or 58 of FIGS. 15–17) is viewed on the viewing or projection screen 50 and an appropriate registration mark, comprising the image of the screw 84, is aligned with respect to a corresponding alignment or registration mark 86 on the viewing screen 50 in a vertical way by manual longitudinal positional adjustment of the film strip 52. Lateral adjustment of the projected image on the viewing screen 50 is achieved by adjusting an adjustment screw 88 (best shown in FIG. 5) which laterally shifts the angular position of the reflection mirror 46.

The film drive wheel ratchet 74 is connected to a square positioning member, shown in phantom at 91 in FIG. 7, which is adapted to be forcibly resiliently abutted by a locking tongue member 93 pivotally attached at its rear end and having its free end connected to the outer end of a pull cable 95 which is slidably mounted in a fixed sheath 97; the other end of said pull cable 95 being affixed to a release knob 90 carried on the rear wall 34 of the housing 22 which normally does nothing when in the relationship shown in FIG. 2 but which, when manually pulled outwardly, pulls the locking tongue 93 downwardly against the compression spring 99 and away from the square positioning member 91 to effectively release the film drive wheel ratchet 74 so that it may be freely rotated in a film advancement direction, or if sufficient clearance from the pawl 70 exists, the ratchet 74 (and, correspondingly, the film 52) may be moved in either direction. In certain forms of the invention, said square positioning member 91 may be coupled with respect to the previously mentioned conventional film driving sprocket wheel means rather than to the film drive wheel ratchet 74 which will allow the film strip 52 to be freely moved in either direction through the film guide slot 66 and through the complete optical projector means 44 for facilitating the rapid location of a different sequence of projection panel frame means on a different portion of the film strip 52 or for quick disengagement of the film strip 52 from the optical projector means 44 when desired.

It should be noted that the rear wall 34 of the lower portion of the housing 22 has a film egress slot at the location indicated at 92 in FIG. 10 which allows the film strip 52, after it has passed through the optical projector means 44, to extend upwardly into engagement with a film strip take-up reel means 94 which is coupled by a resilient frictional type pulley belt means 96 and the differently sized pulley sheaves 98 and 100 carried respectively by said take-up and supply reels 94 and 62, whereby to maintain the film 52 taut at all times by reason of the variable slippage allowed by the type of frictional engagement of said elastic or resilient pulley belt member 96 with respect to said two differently sized pulley sheaves 98 and 100. The pulley 96 may comprise a loop formed of a helical spring means, for example, which provides the desired tension and yet allows controlled slippage with respect to the pulley sheaves as required or needed. It will be noted that the take-up reel 62 is pivotally mounted on a forward mounting arm 102 which, in turn, is pivotally attached to a mounting bracket 104 attached to the top wall 26 of the upper portion of the housing 22, while the rear positioned take-up reel 94 is pivotally mounted on another similar arm 106 which is similarly pivotally attached with respect to said mounting bracket 104, thus providing an arrangement which allows the supply and take-up reels 62 and 94 to freely pivot into the position shown in FIG. 10 where all portions of the film strip 52 are taut and the complete drive for movement of the film strip 52 is provided by the previously mentioned film advancement means 68 (best shown in FIGS. 2 and 7 in physical form and in FIG. 14 in electrical schematic form).

It should also be noted that the conventional type optical projector means, generally indicated at 44, additionally includes a cooling fan which is not shown in physical form in the drawings, but which is designated schematically at 219 in FIG. 14. Further details of the optical projector means, generally designated at 44, are not thought necessary since many such arrangements are well known in the art and since this individual feature does not touch upon the real inventive concept of the present invention.

Incidentally, in connection with the previously described optical projection means, generally designated at 44, it should be noted that the previously mentioned first and second mirror means 46 and 48 merely comprise an effectively longitudinally folded optical path for the proper projection distance so that the enlarged image will be projected upon the back surface of the projection or viewing screen 50 in a manner such that the upper problem presentation portion thereof can be directly viewed by a student sitting or standing on the near side of the complete apparatus as shown in FIG. 1.

Incidentally, it should be noted that the lower correct answer and response portion of any of the projection panel film frame means, or the projected image thereof, as shown at the bottom portion of each of FIGS. 15–17 is so positioned as to be projected below the level of the viewing screen 50 so as to be completely invisible to the student or trainee. This is extremely important as will be described in detail hereinafter, since such correct answer and response portion of any given projection panel frame means and the image projected thereby will be received by the photosensitive means generally designated at 108 for providing the hereinafter described correlation electrical circuitry of the machine with the necessary data for proper correlation and/or control with respect to the student's motor response actions to the problem visibly presented on the projection or viewing screen 50 so that the student's motor response actions can be automatically evaluated as to correctness or incorrectness and will correspondingly govern the subsequent operation of the complete apparatus.

Said photosensitive means, generally indicated at 108 in the form illustrated, comprises twelve photocell means carried by mounting means comprising the panel 110 mounted immediately below the projection or viewing screen 50. Said mounting means or panel 110 carries said twelve photocells, generally designated at 108, in a plurality of cylindrical shield members 112 to effectively provide a narrow optical reception angle therefor and directed rearwardly for receiving a corresponding plurality of light or dark, substantially rectangular regions of projected light, such as shown in phantom at 114 in FIG. 3, and as indicated at 114' with respect to the corresponding original projection panel frame means, such as most clearly shown at 56 and 58 in FIGS. 16 and 17. It should be understood that said plurality of light and dark regions 114' carried at the bottom of each projection panel frame means 56 or 58 in FIGS. 16 and 17 effectively comprise the previously generically referred to lower correct answer and response portion of each projection panel frame means of the film strip 52, such as generally designated at 56 in FIG. 16, or 58 in FIG. 17. It should be noted that the proper coding of said rectangular correct answer portions comprising the twelve light or dark regions 114', and the corresponding projection images 114 shown in phantom in FIG. 3, provide all information as to the correct solution and correct motor responses of a student pilot or trainee to the problem visibly presented by the upper problem projection portion, generally designated at 116, of either of the projection panel frame means 56 or 58 of FIGS. 16 and 17.

It will be noted that said upper problem presentation portion 116, in the case of FIG. 15, merely comprises the visible presentation of certain information or data about the conditions governing a series of subsequent problems. In this first frame of a problem sequence, as shown at 54 in FIG. 15, the lower correct answer and response portion is generally designated at 118, and is completely dark. In other words, this corresponds to having all of the twelve possible light and/or dark answer code portions 114' of either FIG. 16 or FIG. 17, dark, which corresponds to no answer required on the part of the student or trainee whatsoever relative to any of the controls carried by the machine and simulating conventional airplane controls. Therefore, said first problem presentation upper portion 116 of the first projection panel frame means 54 of a problem sequence requires no control action on the part of the student and, upon operation of the film advancement switch means 120 by pressing either of the film advancement pushbuttons 122, the film advancement means 68 will operate to advance the film strip 52 from the first frame 54 to the second frame 56. Then the optical projector means 44 will project an image of the upper problem presentation portion 116 of said second projection panel frame means 56 on the projection or viewing screen 50 so that the student may look at the representations of the six conventional airplane instruments conventionally carried on the instrument panel of an airplane to determine whether or not the hypothetical airplane is operating in accordance with the instructions supplied to the student by the previous projection panel frame means 54. It should be noted that the lower correct answer portion comprising the twelve light or dark answer code regions 114 will not be seen by the student but will be received by the twelve photocells 108.

The six airplane instruments shown in the projection panel frame means 56 comprise in the top row, reading from left to right, an air speed indicator, an azimuth heading indicator, an artificial horizon simulating instrument indicating the relative position of the airplane with respect thereto around a longitudinal fore and aft axis of rotation and a lateral left-to-right axis of rotation perpendicular to said longitudinal axis, and, in the bottom thereof, said instruments comprise an altimeter, a left and right turn and bank indicator, and a climb or descent indicator indicating whether the airplane is climbing, descending, or in level flight and the relative angular relationships of such climbing or descending flight with respect to level flight as a reference in terms of rate of climb or descent per unit of time. It will be noted that the six airplane instruments shown in the projection panel frame means 56 of FIG. 16 and which will, of course, be projected onto the viewing screen 50 and viewed by the student or trainee clearly indicate that the hypothetical airplane is performing in exact accordance with the information supplied in the preceding projection panel frame means 54 and that, therefore, no corrective control response action of a type altering the operation of the hypothetical airplane is needed. All that is required for the student to do is to maintain an intermediate or neutral position of each of the four controls, and this is precisely what the answer code pattern of light and dark regions, as indicated at 114' in FIG. 16, and the projected images thereof, as indicated at 114 in FIG. 3, correspond to.

In other words, as long as the student leaves each of the four controls in neutral position, when he operates the film advancement pushbutton 122, the film advancement means 68 will advance the film strip 52 into the next projection position with the projection panel frame means 58 in projection relationship with respect to the optical projector means 44.

Careful examination of the information supplied by the six airplane instruments, as shown in said projection panel frame means 58, which will, of course, be the image projected on the viewing screen 50, clearly indicates that now some corrective action is required on the part of the student or trainee, and this comprises appropriate operation of the proper one or more of the four controls to cause the upper right hand instrument, comprising the artificial horizon indicating instrument, to return to the relationship thereof shown in the preceding projection panel frame means 56. The student's problem is to determine which one or more of the four controls he should operate, and in what manner he should operate same, to bring about this return of the appearance of said upper right hand instrument to that shown in the preceding projection panel frame means 56 as illustrated in FIG. 16.

It is apparent that what said instrument indicates is that one wing of the airplane is down and that correct response action required to return the airplane to the original conditions specified in projection panel frame means 54 shown in FIG. 15 is the operation of an aileron control means and coordinated operation of rudder control means in the proper manner. This is clearly indicated by the left group of three light and dark rectangular regions 114', and the next group of three light and dark rectangular regions 114' of FIG. 17 when compared to the relative positional orientation thereof, as shown in FIG. 16.

Therefore, if the student or trainee grasps the partial wheel simulating member 124 by either or both of the handle portions 126 thereof and rotates same around the longitudinal shaft member 128, which structures comprise what might be termed airplane aileron control means, the aileron control switch means, indicated at 130 and 132, will be appropriately operated for correlation with the corresponding one of the previously mentioned photocell means 108 upon which the relatively dark rectangular answer code portion 114' is projected, whereby to provide a correct response as far as said aileron control response action is concerned. Then if the student or trainee also appropriately operates the rudder control means, generally designated at 134, by operating either the left or right foot pedal portions 136 or 138 thereof in the proper manner, a corresponding rudder control switch means 140 or 142, will be appropriately operated for correlation with the corresponding one of the previously mentioned photocell means 108 upon which the relatively dark rectangular answer code portion 114' is projected whereby to provide a correct answer as far as said rudder control is concerned.

If both said aileron control means 124, 126, and 128 and the aileron control switch means 130, 132, and the aileron operating cam means 144 carried by the shaft 128, and said rudder control means 134, are properly operated by the student or trainee in the manner just referred to and corresponding to the two left groups of staggered light and dark projection regions 114' shown in the bottom correct answer propection portion of the projection panel frame means 58 of FIG. 17, then operation of either of the manual advancement pushbuttons 122 will cause the film advancement means 68 to move the film strip 52 to the next film projection panel position (not shown). This type of operation may continue through an entire sequence of problems as presented by a corresponding number of projection panel frame portions on the film strip 52 and, in each case, the operation of the various control means in the proper manner will allow the subsequent operation of either of the manual advancement pushbuttons 122 to advance the film strip 52 one frame to the next problem.

However, whenever an incorrect response is made by a student or trainee by the incorrect operation or lack of operation of any of the four controls, then operation of either of the manual advancement pushbuttons 122 by the student or trainee will not result in energization of the film advancement means 68 and, therefore, will not bring about advancement of the film strip 52 to the next projection panel frame means thereof, but will result in operation of an error counter, generally indicated at 146. A knurled reset thumb-operable wheel or knob 150 is provided for resetting the counter indicia display means 148 to zero, after completion of a training sequence of problems and attempted answers thereto.

The other two types of controls provided in the exemplary pilot training form of the invention illustrated comprise an airplane elevator control means and an airplane engine throttle control means, with each being provided with appropriate operating cam means and switch means in a manner similar to the aileron control means and rudder control means previously described.

In the exemplary form illustrated, said airplane elevator control means partially comprises the same elements as the previously described aileron control means and includes the partial wheel-simulating means 124, the two handle members 126, and the longitudinal shaft member 128 is longitudinally mounted for fore and aft sliding action in the manner of a conventional airplane aileron control means by means of a front bearing or ring 152 in the front wall 32 of the housing means 22 and a similar rear bearing or ring 154 carried by an upstanding partition 156. This allows the entire longitudinal shaft member 128 to be slidably moved forwardly or rearwardly, corresponding to elevator down control action and elevator up control action, respectively, and it will be noted that an elevator cam means 158 is carried by the longitudinal shaft member 128 and is adapted to operate the corresponding elevator switch means 160 or 162, respectively, for connection with respect to the corresponding one of the group of three photocell means 108 of FIG. 3 upon which the *dark* projection answer code region is projected when a correct answer and response is provided to any particular problem presented on the viewing screen 50.

In the exemplary form illustrated, the above mentioned airplane engine throttle control means is generally designated at 163, and comprises an actuating handle 164 connected to a longitudinally slidably mounted rod member 166 which carries an engine throttle cam 168 thereon, very similar to the elevator cam 158 and which similarly cooperates with switch means 170 and 172 in a manner similar to the operation of the elevator cam 158 with respect to the elevator switch means 160 and 162 and adapted to correlate with the corresponding engine throttle photocell means 108 of FIG. 3 for indicating a correct or incorrect motor response answer on the part of a student or trainee with respect to a problem visibly presented on the viewing screen 50.

In the exemplary arrangement shown in FIGS. 16 and 17, it should be noted that the rectangular answer code projection regions 114', as pointed out above, are twelve in number, and that, actually, each group of three thereof corresponds to one of the four types of controls mentioned hereinbefore as comprising the rudder control means, the bank or aileron control means, the elevator control means, and the engine throttle control means, and, in fact, each group of three light and dark answer code regions 114' (in each case including one dark and two light regions) are arranged from left to right in accordance with the control sequence just referred to. That is, referring to FIG. 16, the left group of three rectangular answer projection regions (comprising two lower light regions and one upper dark region) correspond to the rudder control, the next group of three rectangular answer code projection regions (comprising one lower dark and two upper light regions) correspond to the aileron control, the next group of three rectangular answer code projection regions (comprising one upper dark and two lower light regions) correspond to the elevator control, and the final or right hand group of three answer code projection regions (comprising one lower dark and two upper light regions) correspond to the engine throttle control, and, in each case, it will be noted that the intermediate rectangular projection region of each group of three is the dark one, while the other two are the light ones. This, as previously mentioned, corresponds to a neutral or unchanged operation of all four of said controls, comprising the rudder control, the aileron control, the elevator control, and the throttle control, while the showing of FIG. 17 indicates that the required corrective action is operation of the left rudder pedal 136 and operation of the aileron control means into the left position by turning the shaft 128 in a counter clockwise direction as viewed head on.

Incidentally, it should be noted that each of the control members is effectively spring biased and adapted to return automatically to the normal, neutral position. In the case of the rudder control means 134, this is interiorly contained within the rudder control unit and is not specifically shown. However, in the case of the aileron control means and the elevator control means, said return means comprises the biasing spring means 174, which are effectively connected to opposite ends of the tie rod means 176, whereby to always return the longitudinal shaft member 128 to a neutral, longitudinal position and to a neutral rotary position. In the case of the throttle control means 163, two similar coil compression biasing spring means 178 are provided for centering purposes, and each is mounted on the longitudinal shaft 166 between two abutment members 179 longitudinally spacedly mounted on and affixed to said shaft 166 and an upstanding, centrally apertured bearing plate member 180 with outer ends of the springs 178 abutting said members 179 and with inner ends abutting the apertured bearing plate 180, through which the longitudinal shaft 166 slidably passes, whereby to normally maintain the shaft 166 in its normal, neutral position as shown in FIG. 2 and to return it to said normal, neutral position after manual operation, either forwardly or rearwardly therefrom and manual release thereof.

The following description can best be understood by reference to FIG. 14 comprising a circuit schematic of the exemplary form of the invention.

It should be noted that each of the four types of controls, comprising a rudder control, an aileron control, an elevator control, and a throttle control, as previously mentioned, is effectively provided with a corresponding electric circuit control portion, such as generally designated at 182, 184, 186, and 188, electrically connected in parallel with respect to each other as is clearly shown in FIG. 14 and provided with, and connected in series with respect to, a common error circuit portion 190, with said parallel control circuit portions and said common error circuit portion 190 being adapted to be connected between the terminals of an electric power supply source. One such power supply source is indicated in broken line, block diagrammatic form at 192 in FIG. 14, and is illustrated as comprising rectifier, filter, and voltage-reducing means of well known conventional types adapted to be supplied with a conventional 110–120 volt alternating current from a plug or connector 194 through the main control switch 82, and which is adapted to supply through an output lead 196 a rectified, filtered, reduced voltage of a magnitude such as 26 volts D.C., for example, although not specifically so limited; said lead 196 effectively comprising one of the aforementioned power supply terminals, the other one of which effectively comprises the ground connection indicated at 198, which, of course, connects to the ground connection 200 at the lower end of the common error circuit portion 190.

Each of the above-mentioned parallel control circuit portions 182, 184, 186, and 188 is provided with corresponding control switch means 140 and 142, 130 and 132, 160 and 162, and 170 and 172, effectively operable in correspondence with the operation of the corresponding rudder control means 134, the corresponding aileron control means 124, 126, 128 and 144, and the corresponding elevator control means 124, 126, 128, and 158, and/or the corresponding throttle control means 162, whereby, in each case, to connect only one of the three possible answer circuit portions 182a, 184a, 186a, and/or 188a of the corresponding four different control circuit portions generally designated at 182, 184, 186, and 188.

Each of said three answer circuit portions 182a, 184a, 186a, and 188a of said four control circuit portions generally designated at 182, 184, 186, and 188, is provided in series therewith with a corresponding one of the previously mentioned twelve photocells 108, which are of a type which normally has an extremely high resistance—in other words, its "dark resistance" is quite high—but which is adapted, upon the reception of a substantial quantity of light thereon, to have its resistance greatly reduced, in other words, to have a "light resistance" of a relatively small magnitude much less than its "dark resistance." It will be clear, upon careful examination of FIG. 14, that when any particular problem is visibly presented to a student by projection of the upper problem presentation portion 116, such as shown in FIG. 17, for example, the dark one of the answer code projection rectangular portions or regions 114' in each of the four groups of three thereof will cause a corresponding dark projection region 114 which will effectively provide the high resistance photocell 108 in that particular group of three photocells, and this will be the one of the three corresponding possible answer circuit portions 182a, 184a, 186a, or 188a, which is to be connected in series to the common error circuit portion 190 by appropriate operation of any of the corresponding four sets of switch means 140 and 142, 130 and 132, 160 and 162, or 170 and 172, by operation of any of the corresponding rudder control means, aileron control means, elevator control means, and/or throttle control means.

When the correct response is provided and the dark photocell in each set of three of the four different groups thereof is connected to the common error circuit portion 190, the magnitude of electric current in said common error circuit means 190 will be below a predetermined minimum relay actuation value such as to be incapable of energizing the common error circuit relay operating coil means 202 to a degree such as to open the normally closed error relay switch means 204. Of course, the switch means 206 in the common error circuit relay portion 190 is normally in the position shown in FIG. 14 connecting said error circuit portion 190 to ground at 200 and, therefore, to the power supply 192.

Under the conditions of operation just described, the error relay switch 204 will remain in the position shown in FIG. 14 and, after the student is satisfied that he has taken the correct response action to a problem visibly presented on the viewing screen 50 by appropriate operation of the rudder control, the aileron control, the elevator control, and/or the throttle control, as referred to hereinbefore, then the student or trainee may operate either of the manual advancement pushbuttons 122, and this will connect one of the main A.C. input leads 208 by way of a lead 210 to one side of the previously mentioned film advancement solenoid 68 which has its other side connected through the normally closed error relay switch means 204 and the temporarily manually closed advancement pushbutton switch means 120 to ground, as indicated at 212, which, of course, is connected to the ground terminal 198 and to the other A.C. input lead 214, thus causing a single energization of said film advancement solenoid 68 and causing the film strip 52 to advance one frame with respect to the optical projector means 44.

At the same time that the above action occurs, it should be noted that the lead 210 also connects the reset relay actuating coil means 216 through the previously mentioned normally closed error relay switch means 204 to said ground terminal 212 and thus operates the previously mentioned normally closed reset relay switch means 206 in the common error circuit 190 and effectively opens same and disconnects said common error circuit 190 from ground at 200 and, therefore, from the ground side of the power supply 192. This, of course, temporarily inactivates all of the control circuits 182, 184, 186, and 188, until such time as the manual advancement pushbutton 122 is released, at which time de-energization of the reset relay actuating coil 216 will occur and also de-energization of the film advancement solenoid 68 will occur. The de-energization of said reset relay actuating coil means 216 will allow the reset relay switch means 206 to again move into the normally closed relationship shown in FIG. 14, whereby to again connect the common error circuit portion 190 to ground at 200 and, therefore, to the ground side of the power supply 192, and thus place all of the control circuit portions 182, 184, 186, and 188 again in condition for operation.

The above describes the sequence of operations when a correct response to a visibly presented problem is made by a student or trainee by properly operating any or all of the four controls. However, in the event that a problem visibly presented on the projection or viewing screen 50 is not properly solved or responded to by a student or trainee by correctly operating one or more of the four control means, then it will be found that in at least one of the four control circuit portions 182, 184, 186, and 188, at least one of the highly *illuminated* photocells 108 will be connected by the corresponding sets of switches 140 and 142, 130 and 132, 160 and 162, and/or 170 and 172, to the common error circuit portion 190 which will thus allow a current of much greater magnitude than that described above for correct response action on the part of a student to flow therethrough and through the error relay actuating coil means 202 which is coupled in operating relationship with respect to the previously described normally closed error relay switch means 204 and which will then effectively open same or move it from the relationship shown in FIG. 14 and previously described above so as to effectively prevent energization of the film advancement solenoid 68 and also to prevent energization of the reset relay actuating coil 216, but so as to positively connect said error relay switch means 204 to an alternate error counter circuit contact means 218 which is electrically connected to one side of the previously mentioned error counter (usually solenoid operated) 146 which has its opposite side connected to the previously mentioned A.C. lead 210, thus causing operation of said error counter 146 just as soon as the student or trainee decides to test the correctness of his response by operating the manual advancement pushbutton 122 which will effectively apply power through said error relay switch means 204 to said error counter 146.

Thus, the error counter numerical display means 148 will advance one number each time the manual advancement pushbutton 122 is depressed by a student or trainee to test the correctness of his preceding responsive action, and each such actuation of the manual advancement pushbutton 122 will not cause the film strip 52 to advance since no energization of the film advancement means 68 will occur. This condition will continue to prevail until the student or trainee has finally taken the correct responsive action to a visibly presented problem by properly operating any or all of the four control means comprising the rudder control means, the aileron control means, the elevator control means, and/or the throttle control means, to disconnect the previously mentioned highly illuminated photocell (or plurality of photocells) 108 from the common error circuit 190 so that the magnitude of the current flowing through the error relay actuating coil 202 drops substantially to a value below a predetermined magnitude such as to allow the error relay switch means 204 to return to its normal position as shown in FIG. 14, whereupon the previously described sequence of operations which occurs upon a correct responsive action on the part of the student or trainee will then prevail.

It should be noted that in FIG. 14 all of the relays are shown in de-energized relationship, which is the relationship corresponding to a proper responsive action on the part of a student.

The A.C. electrical input provided by the input leads 208 and 214 is applied directly to the projection lamp 78 and the projector cooling fan 219 by the lead 210 whenever the main control switch 82 is closed.

To sum up, a brief generalized description of the circuit logic of the arrangement described in detail above follows below.

It will be noted that a student or trainee, upon presentation of a projected image from the film, is required to make one or more correct control motions, of which a single control motion or a plurality thereof actuate one of more of the series of switches 140 and 142, 130 and 132, 160 and 162, and/or 170 and 172, as shown in FIG. 14. A correct control motion is one that switches a corresponding non-conducting one of the photocells 108 into the common error relay circuit portion 190. When this is accomplished, all of the circuit relay positions are as shown in FIG. 14. Upon closing the manual advancement pushbutton switch 120 by pressing either of the manual advancement pushbuttons 122, the answer or reset relay actuating coil 216 and the film advancement solenoid 68 are energized and remain so as long as the manual advancement switch 120 is kept closed. After tionship. If it is not released after such film advancement means 68, the manual advancement pushbutton operating switch 120 should be released into its normal open relationship. If it is not released after such film advancement, then no further film advancement or errors can be recorded, regardless of what control action with respect to the various control means is taken by a student or trainee because the answer or reset relay switch means 206 is held in open position by the actuating coil 216 and, therefore, the error relay actuating coil 202 is out of the circuit and effectively de-energized. When the manual advancement switch 120 is opened, the circuit and relay logic is restarted.

An improper control action or motion on a student's or trainee's part is one which switches one or more of the conducting photocells 108 into the common error relay circuit portion 190. When this happens, the error relay actuating coil 202 is energized and operates the error relay switch means 204 so as to connect the error counter solenoid 146 with respect to the power supply and the manual advancement pushbutton switch means 120 and, at the same time, the answer or reset relay actuating coil 216 is effectively disconnected from the manual advancement pushbutton switch means 120. Then, when the manual advancement pushbutton 120 is closed, the error counter solenoid 146 is energized and an error is registered, and this is the only action which occurs at that time. Then said manual advancement pushbutton 120 should be opened. If, however, any of the control means are moved while said manual advancement pushbutton switch means 120 is still closed and if said control movement is to an incorrect position, no further error will be recorded since the error counter solenoid 146 will remain in the energized position. If any of said four control means is moved to a correct position while said manual advancement position pushbutton switch means 120 is still closed, the film strip 52 will advance and the circuit logic becomes the same as for a correct response, as described above.

It should be clearly noted that the type of problem presented is not limited to the presentation of the visual appearance of six conventional aircraft flight instruments of the type clearly shown in FIGS. 16 and 17, but other instruments, such as navigation instruments, might be visibly presented in image form and provide a navigational problem for the student pilot, or various simulated visual contact conditions presenting situations which simulate those which a student pilot might actually see in flight and which require corrective action on the student's part, may be visibly presented for the purpose of providing the problem for the student to solve. Also, it should be clearly noted that fewer than the number of instruments shown may be employed, and that various other types of instruments or problem presentation means for providing training in a great variety of other types of motor response may be employed in lieu thereof. Additionally, in some cases, the apparatus may comprise a direct teaching machine where the answers may require only two extremes—that is, either yes or no, or the like, or multiple choice answers. In either case, all that is necessary is to provide the proper number of control circuit portions, such as at 182, 184, 186, and 188 in FIG. 14, to correspond to the required types and number of answer operations and/or to correspondingly modify the number of possible answer circuit portions such as shown at 182a, 184a, 186a, and 188a in FIG. 14. Thus, it will readily be understood that the circuit logic and the broad principles of the present invention may be adapted to virtually any type of teaching machine situation. For example, it should be noted that with the four different types of controls illustrated in the exemplary form of the invention shown in the drawings and described in detail hereinbefore, 81 different multiple choice answers are possible since there are four different controls and each may assume three different positions. This obviously means that, when adapted to multiple choice problem presentation and solution purposes, one or more upper problem presentation portions of one or more projection panel frame means may present a problem and a large number of multiple choice answers which may be discrete separate answers or answers with a plurality of major headings or generic statements, each having a plurality of subheadings comprising primary modifiers or species statements and, in certain cases, with each of said modifiers or species statements having a plurality of additional submodifiers or subspecies statements. Obviously, this greatly extends the scope of teaching machine performance.

In certain cases, it may be desirable to use the apparatus of the present invention for more than one student—that is, to present the problem presentation portion of the image projected from any particular projection panel frame means of the film strip 52 onto a somewhat larger viewing screen which might actually comprise a vertical wall of a room or the like, so that the enlarged image of the problem can be viewed by several persons, such as several students and/or an instructor, possibly, while a particular student may operate his controls to provide his response to the problem. In this case, it is necessary to follow a different image projection optical path than that shown diagrammatically and schematically in FIG. 12, and the modified optical projection path is shown in FIG. 13. It will be noted that, in this case, two additional mirrors 220 and 221 are employed for reflecting the upper problem presentation portion of the image corresponding to the upper problem presentation portion 116 of the projection panel frame means, such as shown at 56 in FIG. 16 of 58 in FIG. 17, onto an enlarged viewing screen or wall, such as indicated diagrammatically and schematically at 50' in FIG. 13, and which may be some distance away from the rest of the apparatus. The lower coded correct answer portion, such as shown at 114' in FIGS. 16 and 17, of each projection panel frame means is still projected in the same manner as described hereinbefore, onto the back surface of the panel 110 and, in particular, onto the twelve photocells 108 for cooperation therewith in the same manner as that described hereinbefore in detail. The only difference in this modification is the projection of the problem presentation portion onto the enlarged, forwardly positioned projection viewing screen or wall 50', and this is accomplished by the provision of the two additional mirrors 220 and 221 which normally are folded away into non-use positions with respect to the optical projector means 44 when the apparatus is used in the manner previously described and illustrated in FIGS. 1–12, inclusive.

In this alternate mode of operation, the first additional mirror 220 is pivotally mounted on a mounting arm 222, which is pivotally attached by a bracket 224 to the inside of the housing or case around the optical projection means 44 and is normally swung into the non-use position most clearly shown in FIGS. 2 and 6. However, when the alternate mode of projection shown in FIG. 13 is to be employed, said auxiliary pivotally mounted auxiliary mirror 220 is swung forwardly and outwardly into a position such as is best shown in FIG. 13. At the same time, the other auxiliary mirror 221 is moved from its normal non-use position into the operative position shown in FIG. 13 by opening the side door 226 of the housing 22 and swinging same outwardly around the novel hinge means 228 into an open relationship where it lies in a position such as is best shown in FIG. 13 in diagrammatic top plan view. It will be noted that a slight tilting of said mirror 221 around a horizontal axis may also be necessary, and this is provided by the novel hinge means 228 which provides for pivotal movement around both a vertical axis and a horizontal axis, as is best illustrated in the enlarged, detailed view thereof, comprising FIG. 9, wherein it is clear that the hinge part 230 provides conventional pivotal or hinged movement around a vertical axis, while the threaded stud 232 integrally carried by the circular disc member 234 attached to the door 226, and which passes through the aperture 236 in the other similar circular disc member 238, which is fastened with respect to the vertical hinge member 230, and which is retained in said relationship by a fastening nut 240 fastened onto the right end of threaded stud 232, provides for pivotal movement around a horizontal axis. This allows the projected image to be elevated slightly for appropriate impingement upon the enlarged projection viewing screen or wall 50' at a proper level or height.

It should be noted that, in the preferred exemplary form of the invention specifically illustrated in the drawings and described hereinbefore, the projection panel frame means takes the form of a continuous film strip having a plurality of individually successive projection panel frame means which, in said exemplary illustrated form, may include a sequence of projection panel frame means wherein the first projection panel frame means thereof normally has a portion bearing visibly projectable information specifying the conditions of a number of subsequent problems and wherein the successive projection panel frame means along the film strip and positioned for viewing in succession thereafter, each presents in the upper projectable problem presentation portion thereof a different problem related to the initial condition specified in the first projection panel frame means and each having at the bottom thereof a different set of projection answer code portions indicating the proper responsive action on the part of the student or trainee for the correct solution of the problem visibly presented by the corresponding upper problem presentation portion of that particular projection panel frame means. In other words, in the exemplary arrangement illustrated and described, a sequence is provided comprising a plurality of connected projection panel frame means on a film strip all relating to different problems governed by common conditions which are specified in the first projection panel frame means of said sequence. However, it should be noted that this should not be construed as limiting the invention to the particular arrangement illustrated and described. For example, it is also possible to have a longer film strip bearing several different sets of such sequences, with each sequence beginning with a different projection panel frame means specifying a different set of governing conditions which will govern the remaining projection panel frame means of that particular sequence in the presentation of various different problems related to said particular specified governing conditions. Also as pointed out hereinbefore, individual problems may be set forth in different projection panel frame means rather than a sequence of connected problems governed by an initially specified common set of conditions.

Additionally, it should be noted that while a preferred form of the invention described and illustrated in detail herein, refers to the projection panel frame means as being in the form of a film strip which is readily adapted for use in various conventional types of such intermittent action, still picture type of projectors for such film strips, it should be understood that the projection panel frame means of the invention is not limited to being in continuous film strip. This is also applicable with respect to the apparatus of the present invention. Actually, each projection panel frame means may be in any projectable form, whether physically connected with respect to the next projection panel frame means to be viewed thereafter or not. In fact, a plurality of completely independent slide members, or the like, comprising independent transparencies or reflection type individual projection panel frame means for use in so-called opaque projectors, and not physically connected together in the manner of a continuous film strip, may be employed and, in this case, they may be initially stored, stacked, or arranged in any desired feeding relationship with respect to a projector, whereby to bring about the desired succession of projection panel frame means in projection relationship with respect to an optical projector means. Also, any other arrangement functionally equivalent to the arrangements just described are intended to be included and comprehended within the broad scope of the present invention.

Additionally, it should be noted that the reference in the present specification and claims to the problem presentation portion of each projection panel frame means as being an *upper* portion and the correct answer and response portion thereof as being a *lower* portion, is only to clarify the illustrations shown in the drawing wherein said relative portions of each projection panel frame means are so positioned. Actually, it should be understood that even with reference to said figures of the drawings, said positioning refers primarily to the projected images adapted to be viewed on the viewing screen since conventionally the film strip itself is fed into the optical projector in inverted relationship. Therefore, said use of the words, "upper" and "lower," are to be broadly construed as merely being exemplary of the presentation of the image in the particular form of the invention illustrated herein and to in no way limit the invention thereto since, actually, the problem presentation portion and the coded correct answer and response presentation portion of each projection panel frame means may be positionally modified very substantially from the showings of the drawings of the present invention within the broad scope of the present invention, and all such modifications are intended to be included and comprehended herein.

It should be noted that, in certain forms of the invention a particular problem or sequence of problems may be presented by more than one projection panel frame means bearing initial governing instructions intended to specify the conditions of the succeeding sequence of problems. In other words, the invention is not limited to one such initial instruction panel as referred to hereinbefore.

It should also be noted that the number of photocell means, the positionings thereof, and the pattern or arrangement thereof, may be modified substantially within the broad scope of the present invention in accordance with the type of problems presented for answering and response. Also, it should be noted with respect to the particular type of photocells illustrated in the drawings and described in detail hereinbefore wherein reference is made to "light resistance" and "dark resistance," the first expression is intended to mean the electrical resistance of the photocell when it is illuminated to a very substantial degree—in other words, when it receives a considerable amount of light, while the second term referred to above is intended to mean the electrical resistance of a photocell when it is substantially non-illuminated or receives light of such an extremely low level of illumination as to be substantially dark, comparatively speaking, with respect to the above-mentioned illuminated or "light" condition thereof. One exemplary type of such photocell means comprises cadmium sulfide cells, or photocells made of other suitable photoconductive material responsive to high and low level illuminations by correspondingly varying the electrical conductivity thereof between corresponding high and low levels. However, various other types of photosensitive or photoresponsive means may be employed in lieu of the specific ones just referred to.

Throughout this application, reference has been made to the teaching machine or motor response training apparatus being intended for use by students or trainees. However, this is not to be construed as specifically limiting the invention in any manner since actually it may be very advantageously employed by rated pilots for proficiency testing, and/or checking purposes.

The light and dark rectangular regions 114' comprising the correct answer and response code portion of each projection panel frame means is illustrated in a form wherein the rectangular height of each such code portion 114' is substantially greater than its width. This is primarily because there is little need for lateral corrective poistional compensation of said projection code means 114' as compared to the substantially greater need for longitudinal or vertical corrective positional compensation thereof since the film strip 52 will not shift laterally to any substantial degree in the optical projector means 44 while a considerably greater degree of longitudinal (or vertical) relative positional displacement or misplacement of the film strip 52 may occur during the operation of the projector means 44 by reason of the nature of the film drive, backlash, and the like. Therefore, the projection code means 114' is very closely spaced laterally for maximum use of the available space and has the staggered, zigzag, vertical arrangement illustrated in FIGS. 15–16 and the rectangular, vertically increased height of each of the projection code portions 114' clearly illustrated in said figures in order to compensate for any relative longitudinal (or vertical) displacement of the film 52 so that images projected therefrom onto the photocells 108 as is best shown in 114 in FIG. 3, will still impinge upon the proper ones of said photocells even if a slight longitudinal (or vertical) displacement of the film 52 has occurred after the initial framing of the first frame of the film strip 52 when the presentation of a sequence of problems initially began.

It should be noted that the answer code portions at the bottom of each projection panel frame means, such as generally designated at 118 in FIGS. 15, 16, and 17, respectively, are shown as having a black or dark background with all of the light rectangular projection code portions 114' being shown as white while all of the dark projection code portions 114' are illustrated in a colorcoded form corresponding to and designating black. The reason why said dark or black rectangular projection code portions 114' are color-coded rather than being shown in solid black in a manner similar to the showing of the background is in order to facilitate distinguishing the two on the drawings. In reality they would both appear black. Incidentally, another simplification occurs in said views of the drawings in that each of the projection panel frame means is shown as having a light background with instructions in the case of FIG. 15, and the instrument panel scales or indicia means, or the like, in the case of FIGS. 16 and 17, being shown in black whereas, in actuality, the usual arrangement is the reverse of that shown in the drawings—that is, with a dark or black background and with instructions, such as shown in FIG. 15 and the readings on the instrument panels such as is shown in FIGS. 16 and 17, being white or light in contrast to the black background of each of said problem presentation portions of each of the projection panel frame means. It should be understood that this is done merely for the sake of drawing convenience and is in no way to be construed as limiting the invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. A teaching machine comprising: problem presentation means for visibly presenting a problem for appropriate motor response by a user of the teaching machine, said problem presentation means comprising optical projector means adapted to be provided with at least one projection panel frame means with at least a certain portion of said projection panel frame means bearing a problem presentation projection portion and a problem correct answer and response projection portion, said problem presentation means including projection and viewing screen means adapted to have projected thereon and to visibly display to a user of the teaching machine an image of said upper problem presentation portion of said projection panel frame means, with the lower correct answer and response portion of the image projected from said projection panel frame means being invisible to the user of said teaching machine; a plurality of individually operable problem solution control means positioned for individual and selective effective operation by said user of the teaching machine, each of said control means being effectively provided with a corresponding electric control circuit portion effectively electrically connected in parallel with respect to each other and being provided with, and connected in series with respect to, a common error circuit portion, with said parallel control circuit portions and said common error circuit portion being adapted to be connected between the terminals of an electric power supply source, each of said control circuit portions being provided with corresponding control switch means effectively openable and closable in correspondence with operation of the corresponding control means and also being provided in series therewith with a corresponding photosensitive means adapted to be rendered either conductive or non-conductive in accordance with the reception of light thereon from said correct answer and response portion of the image projected from said projection panel frame means, the correlation or lack of correlation between the operation by said user of the teaching machine of said problem solution control means and the conductivity or non-conductivity of the corresponding ones of said photosensitive means being effectively operable to perceivably indicate the correctness or incorrectness of the response of said user of the teaching machine, by said operation of said problem solution control means, to the problem visibly presented; said control means simulating flight control members for an airplane, comprising an airplane rudder control means, an airplane aileron control means, an airplane elevator control means, and an airplane engine throttle control means.

2. Apparatus as defined in claim 1, wherein said elevator control means comprises a longitudinally movable wheel and shaft member provided with elevator switch-operating means thereon positioned for effective operation, in accordance with the longitudinal position of said shaft member, of a corresponding one of said control switch means, which may be said to comprise an elevator control switch means, into a corresponding one of said control circuit portions in a first manner corresponding to an up elevator position, in a second manner corresponding to a down elevator position, and in a third manner corresponding to a neutral or intermediate elevator position.

3. Apparatus as defined in claim 1, wherein said throttle control means comprises a longitudinally movable actuating member and shaft member provided with throttle switch-operating means thereon positioned for effective operation, in accordance with the longitudinal position of said shaft member, of a corresponding one of said control switch means, which may be said to comprise a throttle control switch means, into a corresponding one of said control circuit portions in a first manner corresponding to an increased throttle position, in a second manner corresponding to a decreased throttle position, and in a third manner corresponding to a neutral or intermediate throttle position.

4. Apparatus as defined in claim 1, wherein said aileron control means comprises a rotatably movable wheel and shaft member provided with aileron switch-operating means thereon positioned for effective operation, in accordance with the rotary position of said shaft member, of a corresponding one of said control switch means, which may be said to comprise an aileron control switch means, into a corresponding one of said control circuit portions in a first manner corresponding to a left aileron up and right aileron down position, in a second manner corresponding to a left aileron down and right aileron up position, and in a third manner corresponding to a neutral or intermediate aileron position of both left and right ailerons.

5. Apparatus as defined in claim 1, wherein said rudder control means comprises a pair of foot-operable pedal members provided with rudder switch-operating means positioned for effective operation, in accordance with the depression of either of said pedal members, of a corresponding one of said control switch means, which may be said to comprise a rudder control switch means, into a corresponding one of said control circuit portions in a first manner corresponding to a left rudder position, in a second manner corresponding to a right rudder position, and in a third manner corresponding to a neutral or intermediate rudder position.

6. A teaching machine comprising: problem presentation means for visibly presenting a problem for appropriate motor response by a user of the teaching machine, said problem presentation means comprising optical projector means adapted to be provided with at least one projection panel frame means with at least a certain portion of said projection panel frame means bearing a problem presentation projection portion and a problem correct answer and response projection portion, said problem presentation means including projection and viewing screen means adapted to have projected thereon and to visibly display to a user of the teaching machine an image of said upper problem presentation portion of said projection panel frame means, with the lower correct answer and response portion of the image projected from said projection panel frame means being invisible to the user of said teaching machine; a plurality of individually operable problem solution control means positioned for individual and selective effective operation by said user of the teaching machine, each of said control means being effectively provided with a corresponding electric control circuit portion effectively electrically connected in parallel with respect to each other and being provided with, and connected in series with respect to, a common error circuit portion, with said parallel control circuit portions and said common error circuit portion being adapted to be connected between the terminals of an electric power supply source, each of said control circuit portions being provided with corresponding control switch means effectively openable and closable in correspondence with operation of the corresponding control means and also being provided in series therewith with a corresponding photosensitive means adapted to be rendered either conductive or non-conductive in accordance with the reception of light thereon from said correct answer and response portion of the image projected from said projection panel frame means, the correlation or lack of correlation between the operation by said user of the teaching machine of said problem solution control means and the conductivity or non-conductivity of the corresponding ones of said photosensitive means being effectively operable to perceivably indicate the correctness or incorrectness of the response of said user of the teaching machine, by said operation of said problem solution control means, to the problem visibly presented; said problem presentation means being adapted to be provided with a plurality of said projection panel frame means, each having one of said problem presentation projection portions and a correlated one of said correct answer and response projection portions, and including intermittent advancement means cooperable upon energization to advance said plurality of projection panel frame means with respect to said projector means from an initial projection panel frame means thereof to a succeeding projection panel frame means thereof, said advancement means being provided with an electric circuit means having manually operable advancement switch means therein and normally closed error relay switch means in circuit therewith, said common error circuit portion connected in series to said parallel control circuit portions being provided with an error relay operating coil means in effective electromagnetically coupled operating relationship with respect to said normally closed error relay switch means in circuit with said advancement means for opening same whenever the current in said error circuit means increases above a predetermined minimum value in response to the connection, in a manner corresponding to an incorrect answer, of one of said control switch means into a corresponding part of one of said control circuit portions which has its photosensitive means effectively illuminated in response to the projection thereon of a light transmissive part of said correct answer and response projection portion of the corresponding projection panel frame means, thus preventing operation of said advancement means by manual operation of said advancement switch means, said error relay switch means being effectively provided with an alternate error counter circuit contact means adapted to be electrically closed in response to operation of said error switch means by said error relay operating coil means and being provided in circuit therewith with electrically operable error counter and indicator means for counting and indicating each error corresponding to each operation of said error relay switch means by said error relay actuating coil means.

7. Apparatus as defined in claim 6, including normally closed circuit interrupting reset relay switch means in said common error relay circuit means connected in series to said parallel control circuit portions, and reset relay actuating coil means electrically connected with respect to said manually operable advancement switch means for energization in response to manual operation of said advancement switch means in a switch closing manner for causing opening of said normally closed reset relay switch means whereby to deactivate said error relay actuating coil means to cause said error relay switch means to return to its normally closed relationship with respect to said advancement switch means and said advancement means.

8. A teaching machine comprising: problem presentation means for visibly presenting a problem for appropriate motor response by a user of the teaching machine, said problem presentation means comprising optical projector means adapted to be provided with at least one projection panel frame means with at least a certain portion of said projection panel frame means bearing a problem presentation projection portion and a problem correct answer and response projection portion, said problem presentation means including projection and viewing screen means adapted to have projected thereon and to visibly display to a user of the teaching machine an image of said upper problem presentation portion of said projection panel frame means, with the lower correct answer and response portion of the image projected from said projection panel frame means being invisible to the user of said teaching machine; a plurality of individually operable problem solution control means positioned for individual and selective effective operation by said user of the teaching machine, each of said control means being effectively provided with a corresponding electric control circuit portion effectively electrically connected in parallel with respect to each other and being provided with, and connected in series with respect to, a common error circuit portion, with said parallel control circuit portions and said common error circuit portion being adapted to be connected between the terminals of an electric power supply source, each of said control circuit portions including a plurality of possible answer circuit portions corresponding in number to a number of at least three manners of selective operation of the corresponding control means connected in parallel with respect to each other, with each of said control circuit portions including said plurality of possible answer circuit portions, additionally including control switch means electrically in circuit therewith for selectively electrically connecting a selected one of a plurality of answer circuit portions of each control circuit portion in series with and comprising a part of said control circuit portion and in series with said common error circuit portion in accordance with the corresponding selected manual operation of the corresponding control means by said user of said teaching machine, each of said possible answer circuit portions being provided in series therein with a corresponding photosensitive means adapted to be rendered either conductive or non-conductive in accordance with the reception of light thereon from said correct answer and response portion of the image projected from said projection panel frame means whereby the series interconnection of said selected answer circuit portion by said control switch means in response to a particular selected manner of operation of said control means with respect to the corresponding one of said possible answer circuit portions which corresponds to the correct answer and response to the problem presented to said user of the teaching machine will cause electric current through said error relay circuit means to be below a predetermined minimum relay actuation value as determined by the dark resistance of the corresponding photosensitive means in said series connected one of said possible answer circuit portions, the correlation or lack of correlation between the operation by said user of the teaching machine of said problem solution control means and the conductivity or non-conductivity of the corresponding ones of said photosensitive means being effectively operable to perceivably indicate the correctness or incorrectness of the response of said user of the teaching machine, by said operation of said problem solution control means, to the problem visibly presented.

9. Apparatus as defined in claim 8, including mounting means mounting said plurality of photosensitive means in said plurality of possible answer circuit portions at a plurality of predetermined spaced projected answer locations for the projection thereon of corresponding areas of light and dark as determined by parts of said corresponding correct answer and response projection portion of said projection panel frame means.

10. Apparatus as defined in claim 8, including mounting means mounting said plurality of photosensitive means in said plurality of possible answer circuit portions at a plurality of predetermined spaced projected answer locations for the projection thereon of corresponding areas of light and dark as determined by parts of said corresponding correct answer and response projection portion of said projection panel frame means, said correct answer and response projection portion comprising a plurality of rectangular answer code projection regions of greater and lesser optical density similarly spaced and arranged to the spacing and arrangement of said photosensitive means of said mounting means, with regions of greater optical density corresponding to correct answers and responses, and with regions of lesser optical density corresponding to incorrect answers and responses.

11. Apparatus as defined in claim 8, including mounting means mounting said plurality of photosensitive means in said plurality of possible answer circuit portions at a plurality of predetermined spaced projected answer locations for the projection thereon of corresponding areas of light and dark as determined by parts of said corresponding correct answer and response projection portion of said projection panel frame means, said correct answer and response projection portion comprising a plurality of rectangular answer code projection regions of greater and lesser optical density similarly spaced and arranged to the spacing and arrangement of said photosensitive means of said mounting means, with regions of greater optical density corresponding to correct answers and responses, and with regions of lesser optical density corresponding to incorrect answers and responses, said rectangular answer code projection regions being three in number for each control means, with one of each three of said answer code projection regions for each control means comprising a dark region corresponding to a correct answer or response and with two of said answer code projection regions for each control means comprising a light region corresponding to an incorrect answer and response.

12. A teaching machine comprising: problem presentation means for visibly presenting a problem for appropriate motor response by a user of the teaching machine, said problem presentation means comprising optical projector means adapted to be provided with at least one projection panel frame means with at least a certain portion of said projection panel frame means bearing a problem presentation projection portion and a problem correct answer and response projection portion, said problem presentation means including projection and viewing screen means adapted to have projected thereon and to visibly display to a user of the teaching machine an image of said upper problem presentation portion of said projection panel frame means, with the lower correct answer and response portion of the image projected from said projection panel frame means being invisible to the user of said teaching machine; a plurality of individually operable problem soluton control means positioned for individual and selective effective operation by said user of the teaching machine, each of said control means being effectively provided with a corresponding electric control circuit portion effectively electrically connected in parallel with respect to each other and being provided with, and connected in series with respect to, a common error circuit portion, with said parallel control circuit portions and said common error circuit portion being adapted to be connected between the terminals of an electric power supply source, each of said control circuit portions including a plurality of possible answer circuit portions corresponding in number to a number of at least three manners of selective operation of the corresponding control means connected in parallel with respect to each other, with each of said control circuit portions including said plurality of possible answer circuit portions, additionally including control switch means electrically in circuit therewith for selectively electrically connecting a selected one of a plurality of answer circuit portions of each control circuit portion in series with and comprising a part of said control circuit portion and in series with said common error circuit portion in accordance with the corresponding selected manual operation of the corresponding control means by said user of said teaching machine, each of said possible answer circuit portions being provided in series therein with a corresponding photosensitive means adapted to be rendered either conductive or non-conductive in accordance with the reception of light thereon from said correct answer and response portion of the image projected from said projection panel frame means whereby the series interconnection of said selected answer circuit portion by said control switch means in response to a particular selected manner of operation of said control means with respect to the corresponding one of said possible answer circuit portions which corresponds to the correct answer and response to the problem presented to said user of the teaching machine will cause electric current through said error relay circuit means to be below a predetermined minimum relay actuation value as determined by the dark resistance of the corresponding photosensitive means in said series connected one of said possible answer circuit portions, the correlation or lack of correlation between the operation by said user of the teaching machine of said problem solution control means and the conductivity or non-conductivity of the corresponding ones of said photosensitive means being effectively operable to perceivably indicate the correctness or incorrectness of the response of said user of the teaching machine, by said operation of said problem solution control means, to the problem visibly presented; said control means simulating flight control members for an airplane, comprising an airplane rudder control means, an airplane aileron control means, an airplane elevator control means, and an airplane engine throttle control means.

13. Apparatus as defined in claim 12, wherein said elevator control means comprises a longitudinally movable wheel and shaft member provided with elevator switch-operating means thereon positioned for effective operation, in accordance with the longitudinal position of said shaft member, of a corresponding one of said control switch means, which may be said to comprise an elevator control switch means, into series connection with a first one of said possible answer circuit portions in a first manner corresponding to an up elevator position, into series connection with a second one of said possible answer circuit portions in a second manner corresponding to a down elevator position, or into series connection with a third one of said possible answer circuit portions in a third manner corresponding to a neutral or intermediate elevator position.

14. Apparatus as defined in claim 12, wherein said throttle control means comprises a longitudinally movable actuating member and shaft member provided with throttle switch-operating means thereon positioned for effective operation, in accordance with the longitudinal position of said shaft member, of a corresponding one of said control switch means, which may be said to comprise a throttle control switch means, into series connection with a first one of said possible answer circuit portions in a first manner corresponding to an increased throttle position, into series connection with a second one of said possible answer circuit portions in a second manner corresponding to a decreased throttle position, or into series connection with a third one of said possible circuit portions in a third manner corresponding to a neutral or intermediate throttle position.

15. Apparatus as defined in claim 12, wherein said aileron control means comprises a rotatably movable wheel and shaft member provided with aileron switch-operating means thereon positioned for effective operation, in accordance with the rotary position of said shaft member, of a corresponding one of said control switch means, which may be said to comprise an aileron control switch means, into series connection with a first one of said possible answer circuit portions in a first manner corresponding to a left aileron up and right aileron down position, into series connection with a second one of said possible answer circuit portions in a second manner corresponding to a left aileron down and a right aileron up position, or into series connection with a third one of said possible answer circuit portions in a third manner corresponding to a neutral or intermediate aileron position of both left and right ailerons.

16. Apparatus as defined in claim 12, wherein said rudder control means comprises a pair of foot-operable pedal members provided with rudder switch-operating means positioned for effective operation, in accordance with the depression of either of said pedal members, of a corresponding one of said control switch means, which may be said to comprise rudder control switch means, into series connection with a first one of said possible answer circuit portions in a first manner corresponding to a left rudder position, into series connection with a second one of said possible answer circuit portions in a second manner corresponding to right rudder position, or into series connection with a third one of said possible answer circuit portions in a third manner corresponding to a neutral or intermediate rudder position.

17. Apparatus as defined in claim 12, wherein said problem presentation means is adapted to be provided with a plurality of said projection panel frame means in the form of a length of film strip bearing said plurality of said projection panel frame means successively therealong with each projection panel frame means having one of said problem presentation projection portions and a correlated one of said direct answer and response projection portions, and including intermittent advancement means cooperable upon energization to advance said plurality of projection panel frame means, in the form of said film strip, with respect to said projector means from an initial position with an initial projection panel frame means thereof in projection relationship with respect to said projector means to a succeeding projection position with the next successive projection panel frame means in said projection relationship, said advancement means being provided with an electric circuit means having manually operable advancement switch means therein and normally closed error relay switch means in circuit therewith, said common error circuit portion connected in series to said parallel control circuit portions being provided with an error relay operating coil means in effective electomagnetically coupled operating relationship with respect to said normally closed error relay switch means in circuit with said advancement means for opening same whenever the current in said error circuit means increases above a predetermined minimum value in response to the connection, in a manner corresponding to an incorrect answer, of one of said control switch means into series connected relationship with respect to a corresponding and incorrect one of said possible answer circuit portions which has its photosensitive means effectively illuminated in response to the projection thereon of a light-transmissive part of said correct answer and response projection portion of the corresponding projection panel frame means, thus preventing operation of said advancement means by manual operation of said advancement switch means, said error relay switch means being effectively provided with an alternate error counter circuit contact means adapted to be electrically closed in response to operation of said error switch means by said error relay operating coil means and being provided in circuit therewith with electrically operable error counter and indicator means for counting and indicating each error corresponding to each operation of said error relay switch means by said error relay actuating coil means.

18. Apparatus as defined in claim 17, including normally closed circuit interrupting reset relay switch means in said common error relay circuit means connected in series to said parallel control circuit portions, and reset relay actuating coil means electrically connected with respect to said manually operable advancement switch means for energization in response to manual operation of said advancement switch means in a switch closing manner for causing opening of said normally closed reset relay switch means whereby to deactivate said error relay actuating coil means to cause said error relay switch means to return to its normally closed relationship with respect to said advancement switch means and said advancement means.

References Cited by the Examiner
UNITED STATES PATENTS

| | | | |
|---|---|---|---|
| 2,030,175 | 2/1936 | LeFevre | 35—9 |
| 2,323,372 | 7/1943 | Bryce. | |
| 2,402,162 | 6/1946 | Holt | 35—1 |
| 3,052,041 | 9/1962 | Luxton et al. | 35—9 |
| 3,060,597 | 10/1962 | Gilbert | 35—12 |
| 3,117,382 | 1/1964 | Schultzberger et al. | 35—9 |
| 3,191,315 | 6/1965 | Hannah | 35—9 |
| 3,233,508 | 2/1966 | Hemstreet | 88—24 X |

EUGENE R. CAPOZIO, *Primary Examiner.*

R. WEIG, *Assistant Examiner.*